United States Patent Office 3,275,603
Patented Sept. 27, 1966

---

3,275,603
POLYMERIZATION OF FORMALDEHYDE
Harry Yakimik, Jr., Garfield, N.J., assignor, by mesne assignments, to Tenneco Chemicals, Inc., a corporation of Delaware
No Drawing. Filed Apr. 25, 1963, Ser. No. 275,513
9 Claims. (Cl. 260—67)

This invention relates to the polymerization of formaldehyde and, more particularly, to processes for the production of high molecular weight polymers of formaldehyde. The invention provides an improved method for controlling the molecular weight distribution of formaldehyde polymers produced by any process in which substantially anhydrous monomeric formaldehyde is polymerized by bringing the monomer into contact with a formaldehyde polymerization initiator.

Recent advances in polymer process technology have made commercially available the high molecular weight polymers of formaldehyde. These polyacetals, which include both the homopolymers and copolymers of formaldehyde, are thermoplastic resins which, upon stabilization, may be fabricated into films, filaments, fibers, rods and tubes. Because of the inherent instability of unstabilized polyacetals (such as polyoxymethylene glycol or polyols) to oxidative or hydrolytic cleavage of the polymer chains or to thermal degradation, generally the raw "uncapped" polymers require stabilization, either by the further reaction of an "uncapped" polymer by acylation, etherification, cyanoethylation, or cross-linking to block the "uncapped" hydroxy groups, by controlled degradation of the polymer chain until an end-group is reached which is inert to further chemical or physical degradation, by the incorporation in the polymer composition of a stabilizer or stabilizer systems which promote the stabilization of the polymer against oxidative, hydrolytic or thermal degradation, or by employing a combination of these techniques.

These stabilization techniques were developed for formaldehyde polymers having molecular weights in the range from about 10,000 to about 200,000 and, preferably, with relatively narrow molecular weight distributions, since the stability of high molecular weight polymers of formaldehyde has been found to be dependent, among other things, upon the molecular weight range and molecular weight distribution of the polymer. In turn, the molecular weight range of formaldehyde polymers is dependent upon many process variables, including the formaldehyde polymerization initiator, the degree of purity of the monomeric formaldehyde or trioxane undergoing polymerization or copolymerization (the terms being used interchangeably herein), the reaction temperature of polymerization, and the presence in the reaction medium of chain transfer agents, such as water, alcohols, monocarboxylic acids (or their esters or anhydrides) and aralkyl ethers. In all commercially important processes for the production of high molecular weight polymers of formaldehyde, control of the molecular weight range and molecular weight distribution of the polymer during polymerization or copolymerization of formaldehyde or trioxane is one of the primary factors in successful operation of the process.

The present invention is based upon the discovery that saturated aliphatic dicarboxylic acids containing from 2 to 10 carbon atoms, the lower alkyl esters of these dicarboxylic acids, and mixtures of both the dicarboxylic acids and their lower alkyl esters, are unusually effective for controlling the molecular weight distribution of high molecular weight formaldehyde polymers when the polymerization is conducted in the presence of these chain transfer agents. Very frequently, these chain transfer agents also improve the yield of the formaldehyde polymer.

Only relatively small concentrations of these chain transfer agents are required in the polymerization reaction medium, for I have found that concentrations as low as 0.001 percent by weight (based on the weight of the monomer introduced into the reaction medium) are effective, although higher concentrations (up to about 20 percent by weight) of these chain transfer agents may be employed in producing high molecular weight polymers having a controlled molecular weight distribution in accordance with the invention.

As used herein, the term "high molecular weight polymer of formaldehyde" includes both linear and branched-chain homopolymers and copolymers of formaldehyde having a molecular weight in the range from about 10,000 to about 200,000 and a melting point in excess of 170° C., the predominant structural feature of both homopolymers and copolymers being the recurring oxymethylene units ($-OCH_2-$) in the polymer chain. Among the most important homopolymers are $\alpha,\omega$-polyoxymethylene glycol, $\alpha,\omega$-polyoxymethylene dicarboxylates (such as the diacetate or dipropionate), and $\alpha,\omega$-polyoxymethylene diethers (such as the methyl, ethyl, or $\beta$-hydroxyethyl ethers), all of which may have $\omega$-substituted-polyoxymethylene branched chains at one or more points in the main polymer chain. The formaldehyde copolymers include both linear and branched-chain polymers in which the recurring oxymethylene units ($-OCH_2-$) in the polymer chains are periodically or randomly interrupted by other oxyalkylene units containing two or more vicinal carbon atoms, or by other units introduced by copolymerizing other monomers, such as $\gamma$-butyrolactone, phthalide or isocyanic acid, with substantially anhydrous formaldehyde or with its trimer, trioxane. The term "process for producing a high molecular weight polymer of formaldehyde" embraces any such process in which substantially anhydrous monomeric formaldehyde or trioxane is polymerized (or copolymerized) by bringing the monomer into contact with a formaldehyde polymerization initiator in a liquid organic reaction medium at a temperature in the range from about $-100°$ C. to about $80°$ C.

Accordingly, the invention contemplates the improvement in a process for producing a high molecular weight polymer of formaldehyde, in which substantially anhydrous monomeric formaldehyde is polymerized by bringing the monomer into contact with a formaldehyde polymerization initiator in a liquid organic reaction medium at a temperature in the range from about $-100°$ C. to about $80°$ C., which comprises conducting the polymerization in the presence of from about 0.001 to about 20 percent by weight, based on the weight of the monomer introduced into the reaction medium, of at least one chain transfer agent selected from the group consisting of saturated aliphatic dicarboxylic acids containing from 2 to 10 carbon atoms, and the lower alkyl esters of said dicarboxylic acids, thereby controlling the molecular weight distribution and improving the yield of the formaldehyde polymer.

Among the various saturated aliphatic dicarboxylic acids (and their lower alkyl esters) which may be used as chain transfer agents to control molecular weight distribution of the formaldehyde polymer in accordance with the invention are oxalic acid, malonic acid, succinic acid, glutaric acid, adipic acid, suberic acid, azelaic acid, sebacic acid, and the methyl, ethyl, propyl and butyl esters of these dicarboxylic acids. Particularly satisfactory results have been obtained by using oxalic acid and the lower alkyl oxalates (i.e., diethyl oxalate) as the chain transfer agent, preferably as a mixture containing from about 50 to 99.9 percent by weight of a dialkyl oxalate and from about 0.1 to about 50 percent by weight of oxalic acid.

To obtain formaldehyde polymers having molecular weights in the range from about 10,000 to about 200,000 and having a relatively narrow molecular weight distribution within such range, from about 0.001 to about 20 percent by weight (based on the weight of monomer introduced into the reaction medium) should be employed. As a general rule, when the saturated dicarboxylic acid is used as the chain transfer agent, only about 0.005 to about 1 percent by weight preferably should be employed, while concentrations in the range from about 1 to about 10 percent by weight are the preferred range when the dialkyl ester of the dicarboxylic acid is used, the percentages being based on the weight of monomeric formaldehyde incorporated in the polymerization reaction medium.

In all commercially important processes for the production of high molecular weight polymers of formaldehyde, the polymerization is conducted in a substantially anhydrous organic reaction medium which remains liquid under the polymerization conditions and which is a non-solvent for the polymer at the polymerization temperatures. Suitable reaction media include hydrocarbons, such as propane, hexane, decane, cyclohexane, benzene, toluene, xylene, and decahydronaphthalene; halogenated hydrocarbons, such as methylene dichloride, chloroform, and chlorobenzenes; ethers, such as diethyl ether, dibutyl ether, dioxane, and tetrahydrofuran. Outstanding results have been obtained using the solvent systems and polymerization conditions described in the copending application of Henri Sidi, Serial No. 133,783, filed August 25, 1961, now Patent No. 3,219,630, which describes the polymerization of monomeric formaldehyde in the presence of a formaldehyde polymerization initiator at a temperature in the range from about 10° C. to about 60° C. in a liquid organic reaction medium comprising an alkylene dicarboxylate having a structure represented by the formula

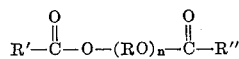

in which R represents a divalent radical selected from the group consisting of —CH₂— and

R′ and R″ each represent a radical selected from the group consisting of alkyl groups containing from 1 to 17 carbon atoms, cycloalkyl groups, and mononuclear and binuclear aryl groups, and $n$ represents an integer from 1 to 3. Illustrative of such alkylene dicarboxylates are methylene diacetate, methylene dipropionate, methylene dibutyrate, methylene acetate propionate, and the low molecular weight polymeric analogs of these dicarboxylates.

Selection of a formaldehyde polymerization initiator may be made from any of the formaldehyde polymerization initiators employed or developed for any process for producing high molecular weight polymers of formaldehyde, and include such initiators as aliphatic amines, aromatic amines, hydroxy polyamines, metalloorganic compounds, phosphines, arsines, stilbenes, and others. Particularly satisfactory formaldehyde polymerization initiators are the metallic chelates described in the copending application of Richard Reynolds, Serial No. 293,843, filed July 9, 1963, of which iron, zinc and zirconium acetylacetonates are but several examples.

The following examples are illustrative of the effectiveness with which saturated aliphatic dicarboxylic acids (and their lower alkyl esters) may be used as chain transfer agents to control the molecular weight distribution of high molecular weight polymers of formaldehyde in accordance with the invention:

Example 1

A series of runs was carried out using the following procedure: Anhydrous monomeric formaldehyde was prepared by adding 100 grams of α-polyoxymethylene over a period of 55 minutes to a stirred solution of 2 ml. of 85 percent phosphoric acid in 700 grams of the diethyl ether of diethylene glycol at 140°–160° C. The formaldehyde vapors from this pyrolysis were passed through two traps, the first of which was maintained at 0° C. and the second at —20° C. The resulting purified anhydrous monomeric formaldehyde was introduced along with a stream of anhydrous nitrogen into a reactor to which had been added 700 grams of methylene diacetate, a solution of 0.1 gram of iron octanoate in 5 ml. of toluene, 0.1 gram of 4,4′-butylidene-bis-(3-methyl-6-t-butylphenol), and a known amount of a chain transfer agent. The reaction mixture was stirred and maintained at a temperature between 25° C. and 38° C. during the addition of the formaldehyde. When all of the formaldehyde had been added, 0.4 gram of anhydrous sodium acetate and 9.5 grams of acetic anhydride were added to the reaction mixture. This mixture was then stirred and heated gradually to its reflux temperature (160°–165° C.) and maintained at that temperature for one hour. A the end of this period, the solution of α,ω-polyoxymethylene diacetate (the term "α,ω-polyoxymethylene diacetate" being used herein to define an acetylated homopolymer of formaldehyde which may have been branched and hence contained more than two acetate groups per molecule) in methylene diacetate was cooled to 125° C. at the rate of approximately 7°–8° C. per hour and then more rapidly to ambient temperature. Following filtration, the α,ω-polyoxymethylene diacetate was washed with 500 ml. of acetone, with two 500 ml. portions of water, and finally with an additional two 500 ml. portions of acetone, the second of which contained 0.1 gram of 4,4′-butylidene-bis-(3-methyl-6-t-butylphenol). The product was then dried under vacuum at 60° C. to constant weight. The chain transfer agents which were used in each of these runs, and the yields and average molecular weights of the polymers (each of which had a narrow molecular weight distribution) are summarized below in Table I.

TABLE I

| Ex. No. | Chain Transfer Agent | Grams Chain Transfer Agent Per Gram of Formaldehyde Polymerized | Yield (Grams) of Product | Average Molecular Weight of Product |
|---|---|---|---|---|
| 1A | Diethyl oxalate | 0.03 | 57.5 | 32,000 |
| 1B | ----do---- | 0.02 | 49.8 | 36,000 |
| 1C | Mixture containing 99.9% by weight of diethyl oxalate and 0.1% by weight of oxalic acid. | 0.036 | 60.5 | 35,000 |
| 1D | None | | 54.0 | 78,000 |

Example II

Anhydrous monomeric formaldehyde was prepared by adding 200 grams of α-polyoxymethylene over a period of 115 minutes to a stirred solution of 2 ml. of 85 percent phosphoric acid in 900 grams of the diethyl ether of diethylene glycol at 140°–160° C. The formaldehyde vapors from this pyrolysis were passed through two traps, the first of which was maintained at 0° C. and the second at −20° C. The resulting purified anhydrous monomeric formaldehyde was introduced along with a stream of anhydrous nitrogen into a reactor to which had been added 2000 grams of methylene diacetate, a solution of 0.2 gram of ferric acetylacetonate in 10 ml. of toluene, and a known amount of a chain transfer agent. The chain transfer agent was added in the form of a dilute solution in methylene diacetate. The reaction mixture was stirred and maintained at approximately 25°–30° C. during the addition of the formaldehyde. When all of the formaldehyde had been added, 0.8 gram of anhydrous sodium acetate, 20 grams of acetic anhydride, and 0.4 gram of 4,4′-butyl-idene-bis-(3-methyl-6-t-butylphenol) were added to the reaction mixture. This mixture was then stirred and heated gradually to its reflux temperature (164°–168° C.), maintained at that temperature for 1 hour, and then slowly cooled to ambient temperature. Following filtration, the product was washed and dried by the procedure described in Example I. Table II sets forth the results of four such polymerizations which were conducted in the presence and one in the absence of the chain transfer agent. The molecular weights summarized for Examples 2A to 2D in Table II were determined to be within a narrow distribution range from the average.

TABLE II

| Ex. No. | Chain Transfer Agent | Grams Chain Transfer Agent Per Gram of Formaldehyde Polymerized | Yield (Grams) of Product | Average Molecular Weight of Product |
|---|---|---|---|---|
| 2A | Diethyl oxalate | 0.075 | 120 | 30,000 |
| 2B | Mixture containing 99% by weight of diethyl oxalate and 1% by weight of oxalic acid. | 0.03 | 125 | 26,500 |
| 2C | Oxalic acid | 0.00015 | 116 | 20,000 |
| 2D | do | 0.000075 | 105 | 28,000 |
| 2E | None | | 107 | 48,000 |

Example III

A series of runs was carried out using the following procedure: Anhydrous monomeric formaldehyde obtained by the pyrolysis of 200 grams of α-polyoxymethylene by the procedure described in Example II was introduced into a reactor to which had been added 2000 grams of methylene diacetate, a solution of 0.2 gram of zinc acetylacetonate in 10 ml. of toluene, and a known amount of a chain transfer agent. The formaldehyde was added over a period of 50 minutes during which the reaction mixture was stirred and maintained at 24°–35° C. When all of the formaldehyde had been added, 20 grams of acetic anhydride and 0.4 gram of anhydrous sodium acetate were added to the reaction mixture. This mixture was stirred and heated gradually to its reflux temperature, maintained at that temperature for one hour, and cooled slowly to ambient temperature. Following filtration, the product was washed and dried by the procedure described in Example I. The chain transfer agents used in each run and the yields and molecular weights of the products obtained are set forth below in Table III.

TABLE III

| Ex. No. | Chain Transfer Agent | Grams Chain Transfer Agent Per Gram of Formaldehyde Polymerized | Yield (Grams) of Product | Average Molecular Weight of Product |
|---|---|---|---|---|
| 3A | Mixture containing 99% by weight of diethyl oxalate and 1% by weight of oxalic acid. | 0.1 | 89.6 | 45,000 |
| 3B | do | 0.05 | 92.0 | 50,000 |
| 3C | None | | 86.0 | 62,000 |

Example IV

Anhydrous monomeric formaldehyde obtained by the pyrolysis of 200 grams of α-polyoxymethylene by the procedure described in Example II was introduced into a reactor to which had been added 2000 grams of methylene diacetate, a solution of 0.276 gram of zirconium acetylacetonate in 10 ml. of toluene, and 15 ml. of diethyl oxalate containing 1% by weight of oxalic acid. The formaldehyde was added over a period of 115 minutes during which the reaction mixture was stirred and maintained at 26°–29° C. When all of the formaldehyde had been added, 20 grams of acetic anhydride and 0.8 gram of anhydrous sodium acetate were added to the reaction mixture. The mixture was stirred and heated gradually to its reflux temperature (161°–166° C.), maintained at that temperature for one hour, and cooled slowly to ambient temperature. Following filtration, the product was washed and dried by the procedure described in Example I. There was obtained 113.5 grams of α,ω-polyoxymethylene diacetate which had a molecular weight of 21,000 and a narrow molecular weight distribution.

I claim:

1. In a process for producing a high molecular weight polymer of formaldehyde, in which substantially anhydrous monomeric formaldehyde is polymerized by bringing the monomer into contact with a formaldehyde polymerization initiator in a liquid organic reaction medium at a temperature in the range from about −100° C. to about 80° C., the improvement which comprises conducting the polymerization in the presence of from about 0.001 to about 20 percent by weight, based on the weight of the monomer introduced into the reaction medium, of at least one chain transfer agent selected from the group consisting of saturated aliphatic dicarboxylic acids containing from 2 to 10 carbon atoms, and the lower alkyl esters of said dicarboxylic acids, thereby controlling the molecular weight distribution and improving the yield of the formaldehyde polymer.

2. In a process for producing a high molecular weight polymer of formaldehyde, in which substantially anhydrous monomeric formaldehyde is polymerized by bringing the monomer into contact with a formaldehyde polymerization initiator in a liquid organic reaction medium at a temperature in the range from about −100° C. to about 80° C., the improvement which comprises conducting the polymerization in the presence of from about 0.001 to about 20 percent by weight of diethyl oxalate, based on the weight of the monomer introduced into the reaction medium, thereby controlling the molecular weight distribution and improving the yield of the formaldehyde polymer.

3. In a process for producing a high molecular weight polymer of formaldehyde, in which substantially anhydrous monomeric formaldehyde is polymerized by bringing the monomer into contact with a formaldehyde polymerization initiator in a liquid organic reaction medium at a temperature in the range from about −100° C. to about 80° C., the improvement which comprises conducting the polymerization in the presence of from about 0.001 to about 20 percent by weight of oxalic acid, based on the weight of the monomer introduced into the reaction medium, thereby controlling the molecular weight distribution and improving the yield of the formaldehyde polymer.

4. In a process for producing a high molecular weight polymer of formaldehyde, in which substantially anhydrous monomeric formaldehyde is polymerized by bringing the monomer into contact with a formaldehyde polymerization initiator in a liquid organic reaction medium at a temperature in the range from about −100° C. to about 80° C., the improvement which comprises conducting the polymerization in the presence of from about 0.001 to about 20 percent by weight, based on the weight of the monomer introduced into the reaction medium, of a chain transfer mixture containing from 50 to 99.9 percent by weight of diethyl oxalate and from 0.1 to 50 percent by weight of oxalic acid, thereby controlling the molecular weight distribution and improving the yield of the formaldehyde polymer.

5. In a process for producing a high molecular weight polymer of formaldehyde, in which substantially anhydrous monomeric formaldehyde is polymerized by bringing the monomer into contact with a formaldehyde polymerization initiator at a temperature in the range from about 10° C. to about 60° C. in a liquid organic reaction medium comprising an alkylene dicarboxylate having a structure represented by the formula

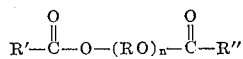

in which R represents a divalent radical selected from the group consisting of —CH$_2$— and

R' and R'' each represent a radical selected from the group consisting of alkyl groups containing from 1 to 17 carbon atoms, cycloalkyl groups, and mononuclear and binuclear aryl groups, and $n$ represents an integer from 1 to 3, the improvement which comprises conducting the polymerization in the presence of from about 0.001 to about 20 percent by weight, based on the weight of the monomer introduced into the reaction medium, of at least one chain transfer agent selected from the group consisting of saturated aliphatic dicarboxylic acids containing from 2 to 10 carbon atoms, and the lower alkyl esters of said dicarboxylic acids, thereby controlling the molecular weight distribution and improving the yield of the formaldehyde polymer.

6. In a process for producing a high molecular weight polymer of formaldehyde, in which substantially anhydrous monomeric formaldehyde is polymerized by bringing the monomer into contact with a formaldehyde polymerization initiator in a liquid organic reaction medium comprising methylene diacetate at a temperature in the range from about 10° C. to about 60° C., the improvement which comprises conducting the polymerization in the presence of from about 0.005 to about 10 percent by weight, based on the weight of the monomer introduced into the reaction medium, of at least one chain transfer agent selected from the group consisting of saturated aliphatic dicarboxylic acids containing from 2 to 10 carbon atoms, and the lower alkyl esters of said dicarboxylic acids, thereby controlling the molecular weight distribution and improving the yield of the formaldehyde polymer.

7. In a process for producing a high molecular weight polymer of formaldehyde, in which substantially anhydrous monomeric formaldehyde is polymerized by bringing the monomer into contact with a formaldehyde polymerization initiator in a liquid organic reaction medium comprising methylene diacetate at a temperature in the range from about 10° C. to about 60° C., the improvement which comprises conducting the polymerization in the presence of from about 1 to about 10 percent by weight of diethyl oxalate, based on the weight of the monomer introduced into the reaction medium, thereby controlling the molecular weight distribution and improving the yield of the formaldehyde polymer.

8. In a process for producing a high molecular weight polymer of formaldehyde, in which substantially anhydrous monomeric formaldehyde is polymerized by bringing the monomer into contact with a formaldehyde polymerization initiator in a liquid organic reaction medium comprising methylene diacetate at a temperature in the range from about 10° C. to about 60° C., the improvement which comprises conducting the polymerization in the presence of from about 0.005 to about 1 percent by weight of oxalic acid, based on the weight of the monomer introduced into the reaction medium, thereby controlling the molecular weight distribution and improving the yield of the formaldehyde polymer.

9. In a process for producing a high molecular weight polymer of formaldehyde, in which substantially anhydrous monomeric formaldehyde is polymerized by bringing the monomer into contact with a formaldehyde polymerization initiator in a liquid organic reaction medium comprising methylene diacetate at a temperature in the range from about 10° C. to about 60° C., the improvement which comprises conducting the polymerization in the presence of from about 1 to about 10 percent by weight, based on the weight of the monomer introduced into the reaction medium, of a chain transfer mixture containing from 50 to 99.9 percent by weight of diethyl oxalate and from 0.1 to 50 percent by weight of oxalic acid, thereby controlling the molecular weight distribution and improving the yield of the formaldehyde polymer.

References Cited by the Examiner

UNITED STATES PATENTS

| | | | |
|---|---|---|---|
| 3,017,389 | 1/1962 | Langsdorf et al. | 260—67 |
| 3,119,789 | 1/1964 | Evers | 260—67 |
| 3,193,532 | 7/1965 | Sidi | 260—67 |
| 3,216,972 | 11/1965 | Sidi | 260—67 |

OTHER REFERENCES

Walker, Formaldehyde, Reinhold, 2nd Ed., 1953, pp. 271–280.

SAMUEL H. BLECH, *Primary Examiner.*

WILLIAM H. SHORT, *Examiner.*

L. M. MILLER, *Assistant Examiner.*